United States Patent [19]

Jones

[11] Patent Number: 4,633,725
[45] Date of Patent: Jan. 6, 1987

[54] TRANSMISSION AND RANGE BOX CONTROL

[75] Inventor: Charles R. Jones, Ottawa Lake, Mich.

[73] Assignee: Dana Corporation, Toledo, Ohio

[21] Appl. No.: 546,728

[22] Filed: Oct. 28, 1983

[51] Int. Cl.$^4$ .......................... B60K 20/00; F16H 3/02
[52] U.S. Cl. ...................................... 74/473 R; 74/745
[58] Field of Search ................ 74/745, 473 R, 473 P, 74/475, 477, 740

[56] References Cited

U.S. PATENT DOCUMENTS

| | | | |
|---|---|---|---|
| 2,637,222 | 5/1953 | Backus | 74/745 |
| 2,694,943 | 11/1954 | Brumbaugh | 74/473 R |
| 2,835,143 | 5/1958 | Kelbel | 74/745 X |
| 3,498,155 | 3/1970 | Ivanchich | 74/745 |
| 3,975,970 | 8/1976 | Elfes et al. | 74/473 R |
| 4,275,612 | 6/1981 | Silvester | 74/745 X |
| 4,296,642 | 10/1981 | Schetter | 74/745 X |
| 4,409,859 | 10/1983 | Yarnell | 74/745 X |
| 4,455,883 | 6/1984 | Radcliffe | 74/473 R X |
| 4,483,210 | 11/1984 | Mayuzumi | 74/745 X |
| 4,494,418 | 1/1985 | Bellah et al. | 74/473 R X |

*Primary Examiner*—Kenneth J. Dorner
*Assistant Examiner*—Stephen Andrews
*Attorney, Agent, or Firm*—Willian Brinks Olds Hofer Gilson & Lione

[57] ABSTRACT

A transmission range selection mechanism for use with a vehicle transmission assembly having a main gear box and an auxiliary, two-speed gear box provides control over both with a single shift lever moved through a conventional shift pattern. The shift lever is pivotally mounted to a transversely disposed shift rail which is translatable between a first and a second position. A two-position sensor is coupled to the shift rail such that one output state is generated when the shift rail is in the first position and the second output state is generated in the second position. The two-position sensor controls selection of the two gear ranges provided by the auxiliary gear box. Three main shift rails are disposed in a conventional, parallel array at right angles to the auxiliary shift rail and include three shift yokes. The outer two shift yokes include spring-biased pins disposed within shift lever receiving slots. The spring rate of the spring-biased pins is such that the shift lever functions as a second class lever to translate the auxiliary shift rail between first and second positions thus commanding corresponding shifts of the auxiliary gear box while the shift lever is engaged within the center shift yoke. Gear sets and thus gear ratios associated with the center shift rail and therefore utilized twice, when the auxiliary gear box is in both its low and its high drive ratio, thus providing additional gear ratios in a conventional, though extended, shift pattern.

20 Claims, 4 Drawing Figures

TRANSMISSION AND RANGE BOX CONTROL

BACKGROUND OF THE INVENTION

The invention relates generally to vehicle transmission control devices and more specifically to a combined control device for a main transmission and auxiliary, two-speed range box.

Manual transmissions having two or three shift rails which provide reverse as well as three or five forward gear ratios, respectively, provide appropriate and sufficient gear ratio ranges and forward speeds to fulfill the requirements of a vast majority of transmission applications. Transmissions providing greater numbers of gear ratios, however, are routinely produced but their size, complexity and cost is representative of their specialization and rather more limited application.

Devices do exist, however, which extend the gear ratio range and thus capabilities of, for example, transmissions having five forward gears. Such devices are auxiliary gear or range boxes which are operably disposed in tandem with the main transmission. Typically, such auxiliary gear boxes provide two gear ranges generally designated high and low which, when combined with the several ranges of the main transmission, effectively double the number of gear ratios and forward speeds which the compound transmission assembly provides. In practice, several of the plural ranges provided by the transmission when the auxiliary gear box is in the lower range typically overlap those provided when the auxiliary box is in its higher range. Often times then, the auxiliary gear box is utilized to augment the higher speed gears of the main transmission by providing still lower overall gear ratios through the transmission assembly and thus improve fuel economy and highway performance. Appropriate selection and combination of lower main transmission gear ratios and range box ratio can, however, readily provide non-overlapping overall gear ratios when the low to high range box shift accompanies a shift between lower gears.

Operator selection of the gear ratio provided by the auxiliary gear box may be accomplished by positioning a two position switch which in turn controls a mechanical transducer in the auxiliary box to select the desired range. The switch may be electric, pneumatic or hydraulic and controls a transducer of the corresponding type disposed at the auxiliary gear box. Frequently, such switch is secured directly to the shift lever such that the operator may select both the gear of the main transmission and the range of the auxiliary transmission with one hand. Such a configuration, however, permits independent selection of the gear ratios of both the main transmission and auxiliary gear box thus generally permitting the gear ratio overlap discussed above. While this situation is not specifically undesirable, it does tend to promote unnecessary gear shifts, clutch wear and less than optimum fuel economy and performance. This is to say nothing of the inconvenience created by the often complex motion required to simultaneously move both the shift lever and the range selector switch attached thereto. Another difficulty of such independent control over the main and auxiliary gear boxes relates to the possibility of inadvertently effecting a change in the ratio of the auxiliary gear box while the clutch is engaged and power is being transmitted through the transmission assembly. Since such a shift is undesirable, it is considered to be beneficial to include means whereby a change between the ratios of the auxiliary gear box is prohibited unless the main transmission is in neutral and thus not transferring power.

Various linkages and shift patterns have been proposed in mechanisms which combine the operation of and control over both the main and auxiliary gear boxes with a single control having a complex shift pattern. For example, U.S. Pat. No. 3,975,970 to Elfes et al. discloses a mechanism whereby a single operating lever both selects one of four gears provided by the main transmission and one of the two ranges provided by an auxiliary gear box. Forward and reverse is independently selected by an additional shift control and independent mechanism. U.S. Pat. No. 2,694,943 to Brumbaugh discloses a complex shift control linkage having pivotally disposed, as well as axially sliding, linkage components which transfer conventional shift lever motion through both vertical and horizontal distance as well as a right angle.

SUMMARY OF THE INVENTION

The instant invention relates to a transmission assembly range selection mechanism for use with a main transmission or gear box including a plurality of forward and at least one reverse gear ratios and an auxiliary gear box providing two additional gear ratios in tandem with the main transmission. The range selection mechanism provides control over both the main transmission and auxiliary gear box with but a single, conventional shift lever disposed in the tower of the main transmission. The main transmission shift tower also includes a transversely disposed shift rail to which the shift lever is pivotally secured. The transversely disposed auxiliary shift rail is axially slidable between first and second positions. A two-position sensor is mechanically coupled to the auxiliary shift rail and indicates by its two state output whether the auxiliary shift rail is in its first or its second position. Disposed generally below and in operable co-location with the terminus of the shift lever is a conventional array of three shift yokes. The center shift yoke is conventional and includes a transversely oriented slot. Each of the outside shift yokes includes a blind slot which is open at the top and side facing the central shift yoke. Disposed within each of the blind slots is a spring-biased pin.

Cooperation between the shift lever disposed upon the transverse, auxiliary shift rail and the three shift yokes, particularly the outside shift yoke having the spring-biased pins effects control over both the main transmission and auxiliary gear box while providing a substantially conventional, though extended, shift pattern. The operation of the mechanism will now be briefly described and, since the mechanism effectively has a memory, it must be initially stated that the auxiliary shift rail is positioned to the left when viewed from the rear of the transmission. In this position, the lower speed range of the auxiliary gear box is selected through the interconnected sensor and operator. In this position, first and reverse may be selected conventionally, the spring-biased pin of the shift yoke associated with the first-reverse shift rail providing the operator with tactile feedback information that these gears are being selected. When the next higher gears, namely second and third gear, are selected, the shift lever engages the centrally disposed shift yoke and selects these gears. When the next higher gears of the main transmission are selected, the spring-biased pin in the other outside shift yoke acts as a pivot and causes the auxiliary shift rail to translate in response to the transverse shift lever motion rather than causing engagement of the main transmission gears associated with the last, outside shift yoke and rail. The auxiliary gear box is now in its higher speed gear range, the shift lever is an incrementally new and distinct position, and the operator reselects the second and third gears of the main transmission which, of course, have been augmented by the change in the gear ratio of the auxiliary gear box. Finally, the highest two gears of the main transmission are selected. This is achieved by depression of the spring-biased pin within the slot of the outside shift yoke associated with the highest speed gears of the main transmission. During this shift, no change in the position or selected ratio of the auxiliary range box takes place. Down shifting causes the tongue of the shift lever to return to the slot within the center shift yoke permitting selection of the second and third gears of the transmission while the auxiliary gear box remains in its higher speed gear. Further down shifting results in the spring-biased pin of the outside shift yoke associated with a first and reverse shift rail acting as a pivot such that the auxiliary shift rail slides axially to the left causing a down shift to the lower speed range of the auxiliary gear box. Once again second and third gear are reselected but this time in combination with the lower speed ratio of the auxiliary gear box. First and reverse may then be correspondingly selected by depressing the spring-biased pin in the slot of the outside shift yoke associated with the first and reverse shift rail and appropriate shift lever motion. Again, the auxiliary gear box does not change gear ratios during this activity. It should be apparent that appropriate design selection of the gear ratios of the main transmission, particularly those associated with the middle shift rail and those of the auxiliary gear box is necessary such that smooth sequential speed and torque relationships are provided by the compound shifting of the main and auxiliary transmissions.

The instant invention thus provides an extended shift pattern which is fully conventional in overall format though it effectively adds two additional gears to widen the torque, speed and power parameters of the main transmission. The instant invention also effectively operates as an interlock to prevent change of the gear ratio provided by the auxiliary gear box when the main transmission is in gear since the gear ratio of the auxiliary gear box can only be changed when the main shift lever is in the neutral position.

Thus it is an object of the instant invention to provide a compound transmission range selection mechanism for use with a main transmission and an auxiliary gear box.

It is a further object of the instant invention to provide a compound transmission range selection mechanism which operates with a main transmission and an auxiliary gear box and which provides control over the selected gear ratios of both gear boxes with a single, conventional shift lever.

It is a still further object of the instant invention to provide a compound transmission range selection mechanism for use with a main transmission and an auxiliary gear box which inhibits change of the gear ratio provided by the auxiliary gear box while the main transmission is in gear.

Further objects and advantages of the instant invention will become apparent by reference to the following description of the preferred embodiment and appended drawings.

DESCRIPTION OF THE PREFERRED EMBODIMENT

Figure 1:
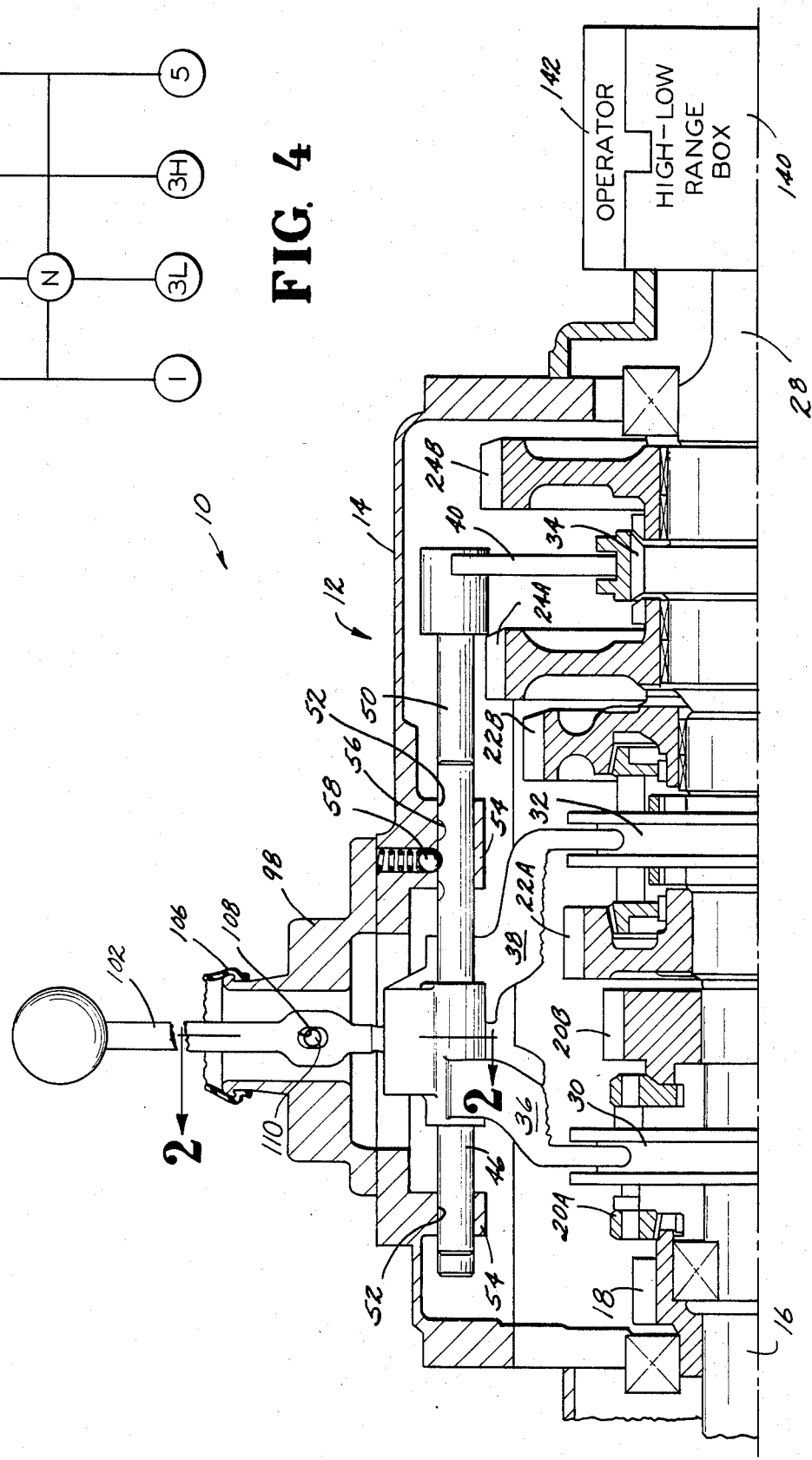
FIG. 1 is a fragmentary, sectional, diagrammatic view of a transmission assembly having a main transmission and an auxiliary gear box which incorporates the instant invention.

Referring now to FIG. 1, a typical vehicle transmission assembly including a main transmission having five forward gears and one reverse gear and a tandem, auxiliary gear box is illustrated and generally designated by the reference numeral 10. The vehicle transmission assembly 10 includes a main transmission assembly 12 having a housing 14 which encloses the mechanisms of the main transmission assembly 12 and provides suitable mounting and support therefore. The main transmission assembly 14 includes an input shaft 16 which is mechanically coupled to a prime mover such as an internal combustion engine through a clutch mechanism (both not illustrated). The input shaft 16 drives a countershaft (not illustrated) through an input gear set, the drive gear 18 being illustrated in FIG. 1. As those familiar with such transmissions will readily appreciate, a plurality of gears (not illustrated) which function as the drive elements of a like plurality of constantly meshing gear sets are secured to the countershaft. The driven elements of such gear sets are a plurality of gears 20A and 20B, 22A and 22B and 24A and 24B which are rotatably and concentrically disposed about an output shaft 28. Dog clutches 30, 32 and 34 are concentrically disposed about the output shaft 28 between the gears 20A and 20B, 22A and 22B and 24A and 24B, respectively. The dog clutches 30, 32 and 34 are coupled to the output shaft 28 through male and female spline sets (not illustrated) in a conventional manner. The spline sets thus permit axial translation of the dog clutches 30, 32 and 34 while rotatably coupling the dog clutches 30, 32 and 34 to the output shaft 26. Axial translation of the dog clutches 30, 32 and 34 effects selection of one of the gear ratios provided by one of the gears 20A, 20B, 22A, 22B, 24A and 24B and insertion of said gear into the power path between the input shaft 16 and the output shaft 28 to provide a given speed and power range for the associated vehicle. Such axial translation of the dog clutches 30, 32 and 34 is effected by like translation of a like plurality of shift forks. A first shift fork 36 engages the dog clutch 30 and selects one of the two highest gear ranges of the main transmission assembly 12 provided by the gears 20A and 20B, shift fork 38 engages the dog clutch 32 and selects the middle ranges of the main transmission assembly 12 provided by the gears 22A and 22B and a shift fork 40 engages the dog clutch 34 and selects between reverse and the lowest forward gear of the main transmission assembly 12 provided by the gear 24A and 24B.

Figure 2:
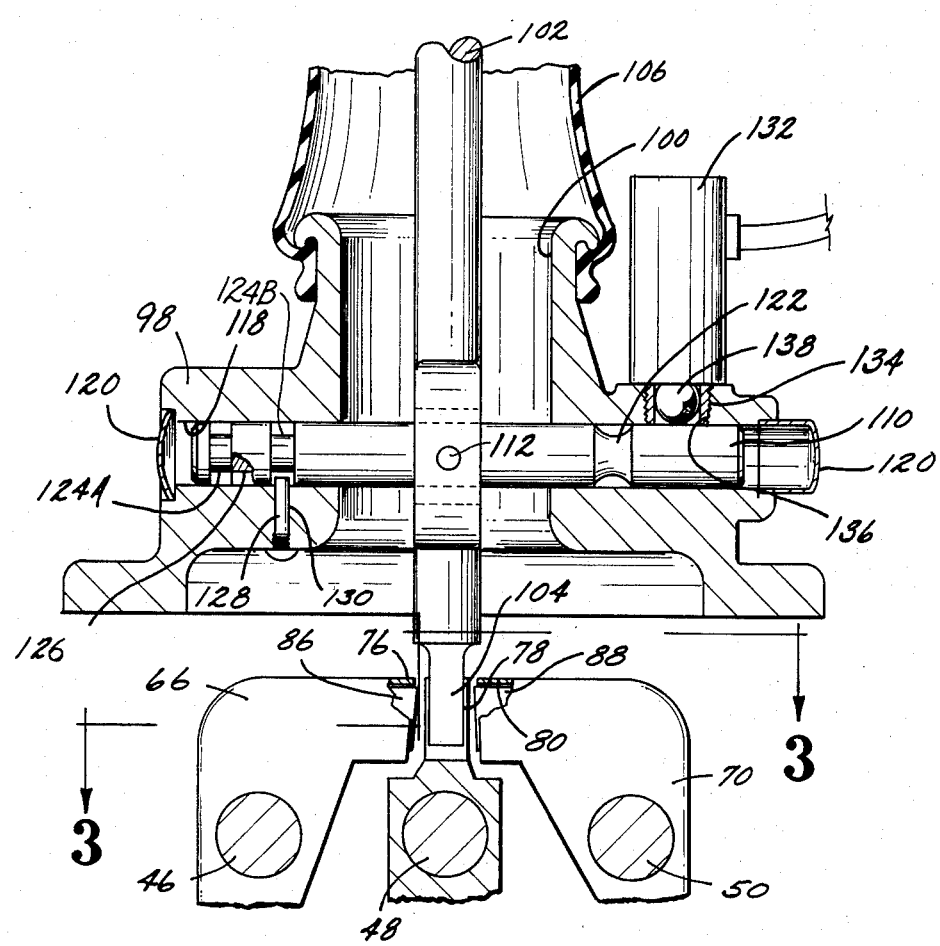
FIG. 2 is a fragmentary, sectional view of a transmission shift tower incorporating the instant invention taken along line 2—2 of FIG. 1.
Figure 3:
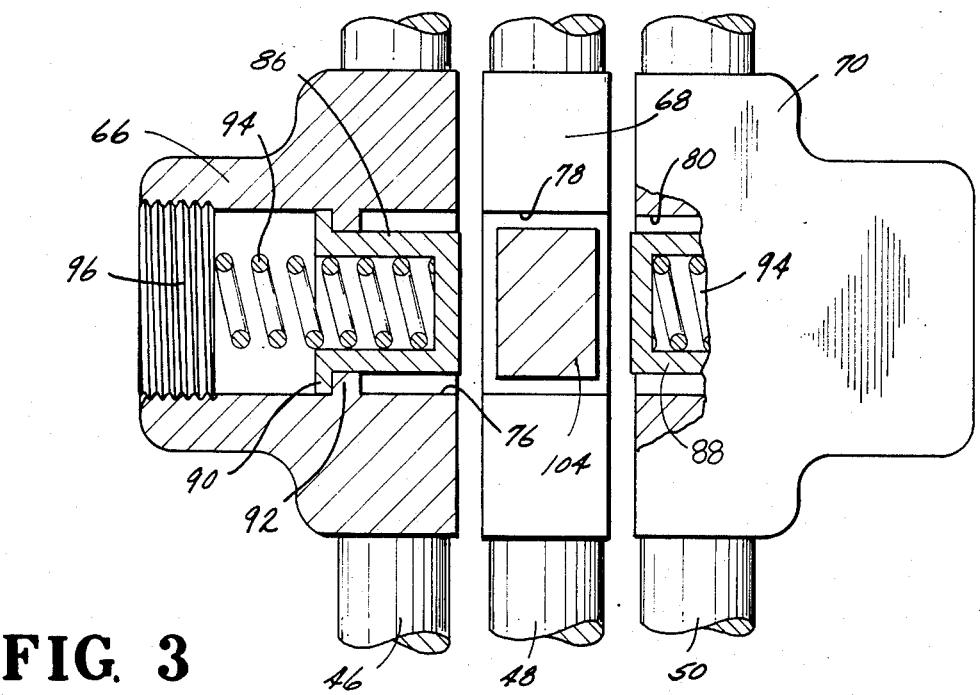
FIG. 3 is a fragmentary, sectional view with portions broken away of the shift yokes and shift rails of a transmission incorporating the instant invention taken along line 3—3 of FIG. 2.

With reference now to FIGS. 1, 2, and 3, it will be appreciated that each of the shift forks 36, 38 and 40 is secured to and axially translated with an associated shift rail 46, 48 and 50, respectively. The shift rails 46, 48 and 50 are preferably disposed in parallel, co-planar alignment and may be slidably received within suitably aligned pairs of apertures 52 bored through appropriately disposed mounting bosses 54 formed in the housing 14. Each of the shift rails 46, 48 and 50 include a plurality of recesses 56 which cooperate in a conventional manner with spring-biased detent pins and balls 58, one of which is illustrated in FIG. 1, to interlock the shift rails 46, 48 and 50 in a conventional fashion. Also associated with each of the shift rails 46, 48 and 50 is a shift yoke assembly 66, 68 and 70. The outer shift yoke assembly 66 associated with the shift rail 46 may be an extension of the mounting structure for the shift fork 36 and includes a shift lever receiving slot 76 having sidewalls generally disposed perpendicularly to the axis of the shift rail 46. The center shift yoke assembly 68 associated with the middle shift rail 48 likewise includes a slot 78 having sidewalls disposed normal to its axis and the outside shift yoke assembly 70, which may be a unitary structure secured to the shift rail 50, includes a slot 80 having sidewalls disposed perpendicularly to the axis of the shift rail 50.

The outside shift yoke assemblies 66 and 70 associated with the outer two shift rails 46 and 50, respectively, each include a spring-biased plunger or pin 86 and 88, respectively. The pins 86 and 88 which may be circular, rectangular or other conveniently formed shape in cross-section are disposed in generally opposed fashion and occupy the slots 76 and 80, respectively, of the shift forks 66 and 70, respectively. The pins 86 and 88 include a circumferential stop 90 which cooperates with a complementarily disposed protuberance or lip 92 formed in the shift fork assemblies 66 and 70 which cooperatively limit axial travel of the pins 86 and 88. A compression spring 94 provides a biasing force which urges the pins 86 and 88 toward one another. The spring rate of the compression springs 94 must be sufficiently great to ensure that certain axial motion of a transversely oriented auxiliary shift rail, to be described below, occurs before such pins 86 and 88 will depress. A removable threaded access fitting 96 may be utilized to facilitate assembly and service of the pins 86 and 88 and compression spring 94 as will be readily apparent.

Referring now to FIGS. 1 and 2, a main transmission assembly 12 is also seen to include a shift tower 98 which is secured to the upper portion of the housing 14 generally above and aligned with the shift yoke assemblies 66, 68 and 70. The shift tower 98 defines a vertically oriented opening 100 through which an elongate shift lever 102 is disposed. The shift lever 102 includes a tongue 104 which may be received within the slots 76, 78 and 80 of the shift yoke assemblies 66, 68 and 70, respectively. A flexible boot 106 preferably formed of an elastomeric material such as rubber seals the region between the upper portion of the shift tower 98 and the shift lever 102. The shift lever 102 includes a bifurcated region defining a aperture 108 through which an auxiliary shift rail 110 extends along an axis generally perpendicular to that of the shift lever 102. The auxiliary shift rail 110 and shift lever 102 are pivotally secured together by a retaining pin 112 which is preferably securely seated within a suitably sized aperture in the shift lever 102 and passes through an aperture having a diameter slightly larger than the pin 112 in the auxiliary shift rail 110. The auxiliary shift rail 110 is generally transversely disposed and slidably received within suitably sized and aligned passageways 118 formed in the shift tower 98. Appropriate caps or seals 120 may be utilized to close the ends of the passageways 118. Adjacent one end of the auxiliary shift rail 110 is a circumferential groove 122 and disposed generally adjacent the opposite end of the auxiliary shift rail 110 is disposed a pair of parallel, circumferential channels 124A and 124B interconnected by a single axially extending channel 126 of similar depth. A register pin 128 which may include a suitable fastening means such as threads which may be received within a complementarily threaded passageway 130 formed in the shift tower 98 registers with one of the channels 124A, 124B or 126 of the auxiliary shift rail 110 at all times and restricts the shift rail 110 to rotary motion about its axis defined by the channels 124A and 124B or axial motion along the length of the channel 126, exclusively.

Finally, the shift tower 98 includes a two-position sensor 132 such as an electrical or pneumatic switch which may be secured to the shift tower 98 by a suitably threaded shank 134. The shank 134 may be received within a complementarily threaded opening 136 in the shift tower 98. The two-position sensor 132 includes a sensing member 136 such as a roller or ball or other similar sensing structure which places the output of the two-position sensor 132 in one state when the auxiliary shift rail 110 is in the position illustrated in FIG. 2 and places the output of the two-position sensor 132 in its alternate state when the sensing member 136 has moved into the circumferential groove 132. A relationship exists between the relative positions of the groove 122, the sensing element 136, the channels 124A, 124B and the register pin 128 such that when these elements are in the position illustrated in FIG. 2, the two-position sensor 132 is in one of its two states and when the register pin 128 is aligned with the channel 124a, the sensing member 136 is received within the groove 122 such that the sensor 132 is in the other of its two states.

Referring again to FIG. 1, the transmission assembly 10 also includes a dual range or high-low gear box 140 disposed in mechanical tandem with the main transmission assembly 12 such that the output shaft 26 drives the gear box 140 which in turn drives the drive shaft (not illustrated) of an associated vehicle. The high-low gear box 140 provides first and second gear ratios which function in tandem with the drive ratios selected in the main transmission assembly and thus augments them. The high-low gear box 140 also includes an operator 142 which moves elements of the gear box 140 appropriately so that the higher or lower range gears are selected and placed in the power path. The operator 142 is preferably an electrically actuated solenoid but may be a pneumatically or hydraulically actuated piston, if desired.

Figure 4:
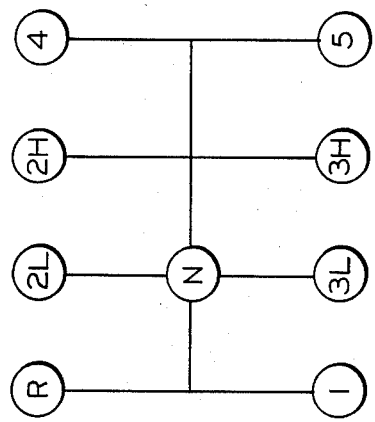
FIG. 4 is a diagram of a shift pattern of a compound transmission incorporating the instant invention.

With reference now to all of the drawing figures, the operation of the transmission assembly 10 will be described. The shift pattern provided by the transmission assembly 10 and specifically the shift lever 102 is illustrated in FIG. 4. Whereas the shift pattern is substantially conventional, though extended by an additional two shift positions, the designations of the shift positions in FIG. 4 clarify the fact that the two additional gear ratios provided by the transmission assembly 10 result from use of the gears 22A and 22B associated with the middle shift rail 48 which provides second and third gear. Thus it should be understood that in order for the transmission assembly 10 to provide appropriate sequential steps of gear ratios to match the routine sequence of increasing vehicle speeds and decreasing torque on upshifts, the gear ratios provided by the gears 22A and 22B and by the gears 24A and 24B which provide the highest speed must be chosen in conjunction with the ratios provided by the high-low gear box 140 such that an appropriate gear ratio sequence is in fact provided by and through the transmission assembly 10 when operated according to the following sequence.

As noted previously, since the mechanism of the instant invention in fact, has memory, it must be established initially that the auxiliary shift rail 110, in the position illustrated in FIG. 2, places the dual range gear box 140 in its lower range. Selection of first and reverse is thus achieved by placement of the shift lever tongue 104 into the slot 80 of the shift yoke assembly 70. It should be apparent that in order to engage the slot 80, the spring-biased pin 88 must and will be depressed. The reaction force to this operation acts as an indication to the operator that either first or reverse gears are being selected, such tactile feedback providing the operator with useful information. Throughout this gear selection process, the auxiliary shift rail 110 remains in the position illustrated in FIG. 2. Selection of second and third gears which are, in fact, second-low and third-low as illustrated in the shift pattern of FIG. 4 occur with the gear box 140 maintaining its low range position. Selection of second and third gears is thus achieved by conventional motion of the shift lever 102. The tongue 104 is moved from the slot 80 into the slot 78 and appropriate axial translation of the associated shift rail 48.

Selection of the next higher gears, namely those designated second-high and third-high in the shift pattern of FIG. 4 begins with returning the shift rail 48 to neutral. Conventional rightward motion of the shift lever 102 to the next higher gear positions then brings about a specific and unique sequence of events. Such rightward motion of the upper portion of the shift lever 102 places the shift lever tongue 104 into contact with the spring-biased pin 86 associated with the shift fork assembly 66. The bias of the spring 94 is sufficiently great to cause the pin 86 to function as the pivot point of a second class lever such that the auxiliary shift rail 110 is shifted to the right from the position illustrated in FIG. 2 to a position where the sensing member 138 seats within the groove 122 and the register pin 128 registers with the circumferential channel 124A. Such motion of the auxiliary shift rail 110 changes the output of the two-position sensor 132 from one state to the other thereby commanding a shift of the operator 142 of the high-low gear box 140 into its higher range. Forward motion of the shift lever 102 thus once again moves the center shift rail 48 to engage second gear. However, since the high-low gear box 140 is in its higher range, second gear is in a correspondingly higher speed range. The third-high gear is selected by conventional rearward motion of the shift lever 102 with no change in the position of the auxiliary shift rail 110. In order to achieve fourth and fifth gear, the shift lever 102 is again returned to neutral. Further rightward movement of the upper portion of the shift lever 102 then results in depression of the pin 86 a sufficient distance such that the tongue 104 of the shift lever 102 can be fully received within the slot 76 of the shift yoke assembly 66, thereby permitting activation in a substantially conventional manner of the two highest speed gear ratios of the main transmission assembly 12.

Downshifting of the transmission assembly 10 comprehends substantially reverse operation of the auxiliary shift rail 110 and the shift yoke assemblies 66, 68 and 70, with due consideration given to the fact, stated previously, that the auxiliary shift rail 110 functions as a memory device. With this in mind, a downshift from the highest gears, namely fourth and fifth gear, is achieved by conventional leftward motion of the upper portion of the shift lever 102. Such motion is assisted by the spring-biased pin 86 and the shift lever tongue 104 thus translates into and is received by the slot 78 within the shift yoke assembly 68. In this position, second-high gear and third-high gear will be achieved since transverse, single increment motion of the shift lever 102 will not cause translation of the auxiliary shift rail 110 from the position wherein the sensing member 138 is seated within the groove 122 of the auxiliary shift rail 110 and the pin 128 is registered in the circumferential channel 124A. Thus, second-high gear and third-high gear may again be selected according to the shift pattern illustrated in FIG. 4. To proceed to still lower gears, the shift lever 102 is once again returned to neutral and the upper portion of the shift lever 102 is moved a further increment to the left. This action again engages the shift lever tongue 104 with the spring-bias pin 88 and such contact functions as a pivot point whereby the shift lever 102 functions as a second class lever causing transverse, axial translation of the auxiliary shift rail 110, returning it to the position illustrated in FIG. 2. In this position, the two-position sensor 132 again returns to its first state, thereby commanding the operator 142 of the high-low gear box 140 to select the lower speed ratio thereof. Once again, second and third gear will be selected by virtue of engagement of the shift lever tongue 104 with the slot 78 of the shift yoke assembly 68. It should be noted that the register pin 128 functions to inhibit axial translation of the auxiliary shift rail 110 and thus range changing of the high-low gear box 140 at all times except when the shift lever 102 and thus the main transmission assembly 12 is in neutral. The final downshift to first gear and reverse gear is correspondingly accomplished, a downshift which also comprehends no axial movement of the auxiliary shift rail 110. When the shift lever 102 is returned to neutral, it may be moved an additional leftward increment in the shift pattern providing first and reverse. Such movement is, of course, resisted by the spring-biased pin 88 as previously described, providing tactile feedback information to the operator through the shift lever 102 that it is about to be moved into the lowest forward gear or reverse gear.

It will thus be appreciated that the mechanism of the instant invention provides control over both a main transmission assembly and an auxiliary range box with but a single, conventional shift lever. It should also be apparent that the shift pattern provided by this mechanism is fully conventional and progresses through a plurality of forward gears in a standard shift pattern while actually controlling both gear boxes. Finally, it will be apparent that the instant mechanism inhibits auxiliary gear box shifts except when the main transmission is in neutral.

The foregoing disclosure is the best mode devised by the inventor for practicing this invention. It is apparent, however, that apparatus incorporating modifications and variations will be obvious to one skilled in the art of vehicle transmissions. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A gear ratio selection mechanism for use with a transmission assembly comprising, in combination, a main gear box having an input shaft, an output shaft, a plurality of gear sets providing a plurality of independently selectable gear ratios between said input shaft and said output shaft, a shift rail disposed for substantially free movement through a limited distance, a shift lever pivotally secured to said shift rail, three shift yokes each including means for receiving a portion of said shift lever, biasing means secured to two of said shift yokes for providing a force urging said portion of said shift lever out of a respective two of said shift lever receiving means, auxiliary gear box means in tandem with said main gear box for providing at least two selectable gear ratios, control means activated by said shift rail for commanding selection of one of said auxiliary gear ratios when said shift rail is disposed in a first position and selecting the other of said two gear ratios when said shift rail is disposed in a second position.

2. The gear ratio selection mechanism of claim 1 wherein said means for receiving a portion of said shift lever is a slot oriented parallel to said shift rail.

3. The gear ratio selection mechanism of claim 1 wherein said biasing means includes a pin extending into said shift lever receiving means and a compression spring.

4. The gear ratio selection mechanism of claim 1 wherein said shift rail includes a pair of spaced-apart channels, and channels oriented perpendicularly to an interconnecting channel disposed along the axis of said shift rail and pin means received within said channels for constraining movement of said shift rail.

5. The gear ratio selection mechanism of claim 1 wherein said control means includes a two-position sensor providing a first state output when said shift rail is disposed in said first position and a second state output when said shift rail is disposed in said second position.

6. The gear ratio selection mechanism of claim 1 wherein said control means includes a transducer for machanically selecting said gear ratios provided by said auxiliary gear box.

7. A gear ratio selection mechanism for use with a transmission assembly comprising, in combination, a main transmission having a housing, an input shaft, an output shaft, a plurality of gear sets providing a plurality of independently selectable gear ratios between said input sahft and said output shaft, a first shift rail disposed for substantially free movement over a limited distance, a shift lever pivotally secured to said shift rail, an array of three main shift rails disposed in a parallel array and having axes normal to the axis of said shift rail, three shift yokes secured to a respective one of said three main shift rails, each of said shift yokes including means for receiving a portion of said shift lever, biasing means for providing a force urging said portion of said shift lever out of two of said shift lever receiving means, auxiliary gear box means in tandem with said main transmission for providing two selectable gear ratios, sensor means activated by said shift rail for providing a first state output when said shift rail is disposed in a first position and a second state output when said shift rail is disposed in a second position, means coupled to said sensor means for selecting one of said two auxiliary gear ratios when said sensor means output is in a first state and selecting the other of said two auxiliary gear ratios when said sensor means output is in said second state.

8. The gear ratio selection mechanism of claim 7 wherein said means for receiving a portion of said shift lever is a slot oriented parallel to said shift rail.

9. The gear ratio selection mechanism of claim 7 wherein said biasing means includes a pin disposed within said shift lever receiving means and a compression spring.

10. The gear ratio selection mechanism of claim 7 wherein said shift rail includes a pair of spaced-apart channels, said channels oriented perpendicularly to an interconnecting channel disposed along the axis of said shift rail and pin means received within said channels for constraining movement of said shift rail.

11. The gear ratio selection mechanism of claim 7 wherein said control means includes a two-position sensor providing a first state output when said shift rail is disposed in said first position and a second state output when said shift rail is disposed in said second position.

12. The gear ratio selection mechanism of claim 7 wherein said control means includes a transducer for mechanically selecting said gear ratios provided by said auxiliary gear box.

13. In a transmission assembly having a main transmission having a housing, an input shaft, an output shaft, a plurality of gear sets providing a plurality of independently selectable gear ratios between said input shaft and said output shaft, an array of main shift rails disposed in parallel arrangement each having a shift yoke defining a slot and an auxiliary range box in tandem with said main transmission providing two selectable gear ratios, the improvement comprising: an auxiliary shift rail disposed normal to the axes of said main shift rails, a shift lever pivotally secured to said auxiliary shift rail, biasing means for providing a force urging said shift lever out of two of said shift yoke slots and control means coupled to said auxiliary shift rail for commanding selection of one of said auxiliary gear box ratios when said shift rail is disposed in a first position and selecting the other of said auxiliary gear box ratios when said shift rail is disposed in a second position.

14. The improvement of claim 13 wherein said biasing means includes a pin disposed within said shift lever receiving means and a compression spring.

15. The improvement of claim 13 wherein said control means includes a two-position sensor providing a first state output when said shift rail is disposed in said first position and a second state output when said shift rail is disposed in said second position.

16. The improvement of claim 13 wherein said control means controls includes a transducer for mechanically selecting said gear ratios provided by said auxiliary gear box.

17. The improvement of claim 13 whereby engagement of said biasing means by said shift lever causes said auxiliary shift rail to translate before translation of said biasing means.

18. The gear ratio selection mechanism of claim 1 wherein said biasing means are secured to the outer two of said three shift yokes.

19. The gear ratio selection mechanism of claim 1 wherein said means for receiving a portion of said shift lever in said two of said shift yokes having biasing means includes an open face for receiving a portion of said shift lever and a wall opposite said open face through which a spring biased pin extends.

20. The gear ratio selection mechanism of claim 19 wherein said spring biased pin extends from said back wall to at least said open face when in its relaxed position.

* * * * *